United States Patent
Boyd et al.

(10) Patent No.: US 6,214,456 B1
(45) Date of Patent: Apr. 10, 2001

(54) HEADLINER MATERIAL WITH POLYESTER AND NON-POLYESTER LAYERS

(75) Inventors: Stuart G. Boyd, North Street; Harold G. Wolf, Jr., Gibraltar; Girma Gebreselassie, Southfield, all of MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/041,714

(22) Filed: Mar. 13, 1998

(51) Int. Cl.[7] ............... B32B 5/22; B60R 13/02
(52) U.S. Cl. ............ 428/317.1; 428/317.7; 428/218; 442/149; 442/151; 442/324; 442/326
(58) Field of Search ......................... 427/317.1

(56) References Cited

U.S. PATENT DOCUMENTS

| | | | | |
|---|---|---|---|---|
| 3,867,240 | * | 2/1975 | Doerfling | 161/41 |
| 3,966,526 | * | 6/1976 | Doerfling | 156/224 |
| 4,211,590 | * | 7/1980 | Steward et al. | 156/79 |
| 4,557,970 | * | 12/1985 | Holtrop et al. | 428/316.6 |
| 4,695,501 | | 9/1987 | Robinson | 428/159 |
| 5,536,556 | * | 7/1996 | Juriga | 428/138 |
| 5,582,906 | * | 12/1996 | Romesburg et al. | 428/286 |
| 5,888,616 | * | 3/1999 | Ang | 428/141 |
| 5,942,321 | * | 8/1999 | Romesberg et al. | 428/300.7 |

FOREIGN PATENT DOCUMENTS

| | | |
|---|---|---|
| 0 373 135 A2 | 6/1990 | (EP) . |
| 0 419 439 A2 | 3/1991 | (EP) . |
| WO 96 13377 A1 | 5/1996 | (WO) . |

\* cited by examiner

*Primary Examiner*—Ellen M. McAvoy
(74) *Attorney, Agent, or Firm*—MacMillan, Sobanski & Todd, LLC

(57) ABSTRACT

A unique headliner includes a pair of spaced polyester fiber mat layers. The polyester fiber layers are preferably felt layers which are needled and consist of a mixture of low and high melt polyester fiber pieces. The low melt fiber pieces are provided with an adhesive sheathing that melts at a low temperature to bond the fiber pieces together. The polyester layers are spaced on opposed side of a polyurethane foam central layer. The combined headliner construction has good strength and acoustic characteristics.

15 Claims, 1 Drawing Sheet

HEADLINER MATERIAL WITH POLYESTER AND NON-POLYESTER LAYERS

BACKGROUND OF THE INVENTION

This invention relates to an improved headliner material having outer polyester fiber mat layers surrounding an inner foam layer of a plastic other than polyester.

Headliners are utilized to cover the ceiling area in modern vehicles. Typically, headliners are formed of a plurality of layers of different materials.

The headliner layers are selected to achieve several different design objectives. First, the headliner must have an attractive appearance, and must maintain its shape over several years of use. In addition, the headliner must provide sound absorption in the vehicle interior.

Headliners have historical utilized layers of fiberglass in combination with foam layers. Fiberglass has some undesirable characteristics in that it is potentially irritating to the skin of the assemblers. More recently, headliners have been proposed wherein the fiberglass layers have been replaced by polyester layers. These proposals have typically been for headliners formed entirely of layers of polyester.

In particular, in one of the proposed polyester bats, the mats are formed of a mixture of low melt and high melt polyester fiber pieces. The low melt pieces are formed to have a polyester-based adhesive sheathing. Upon application of heat the adhesive melts and bonds the low and high melt fibers together. Such headliners are disclosed for example in co-pending patent applications Ser. No. 08/868, 312 now U.S. Pat. No. 6,048,809.

For some headliner applications, the use of pure polyester materials might be somewhat limiting.

SUMMARY OF THE INVENTION

In a disclosed embodiment of this invention, two layers of polyester fiber pieces are formed into a felt mat. A central foam core is positioned between the layers. The central foam core is formed of a plastic material other than polyester. The combination of the foam core and the polyester layers provide a very good headliner construction. The foam core is preferably a polyurethane foam. The combination of the polyurethane foam core and the outer polyester layers provides a strong I-beam construction increases the strength of the headliner, and also increases the acoustical performance. The headliner construction of this invention provides a clean and smooth surface which is substantially wrinkle-free.

In preferred embodiments of this invention, adhesive layers are placed between the polyester layers and the central foam layer. The layers may either be polyurethane-based adhesives or polyester-based adhesives. A decorative layer is positioned outwardly of one of the polyester layers to complete the headliner construction. In some applications, if necessary, additional layers may be inserted into the sandwich construction to provide additional strength.

The polyester mat layers are preferably of the type described above formed a combination of low melt and high melt fiber pieces.

These and other features of the present invention can be best understood from the following specification and drawing.

DETAILED DESCRIPTION OF A PREFERRED EMBODIMENT

Figure 1:
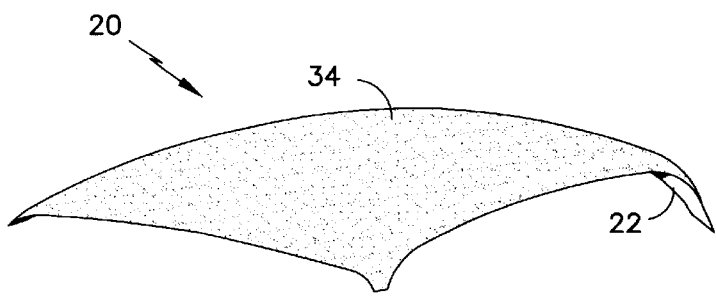
FIG. 1 shows a headliner.

A headliner 20 is shown in FIG. 1. As known, a headliner is positioned within the interior of the vehicle and must perform several challenging design features.

Figure 2:
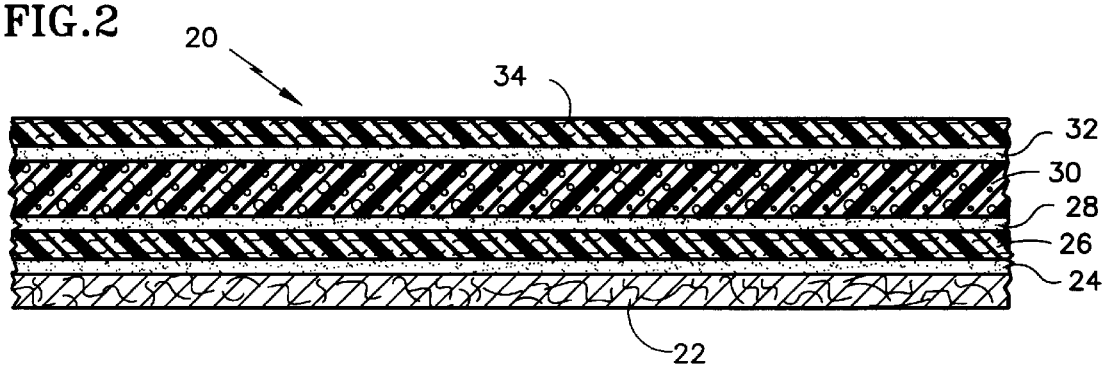
FIG. 2 shows the several layers incorporated into the FIG. 1 headliner.

FIG. 2 shows the headliner construction 20 incorporating an outer decorative layer 22. In a preferred embodiment, this decorative layer was approximately four millimeters thick and formed of a known foam such as may be available from Alpine Company.

An adhesive film 24 is positioned within the outer decorative layer 22. One acceptable film is available from Dow Chemical under its trade name 909 adhesive film. This film is about 0.002" thick.

A layer 26 is positioned inwardly of this adhesive layer, and is formed of a combination of low and high temperature melting polyester pieces. The polyester pieces are preferably needled and formed into a felt. The layer is preferably two to four millimeters thick. An adhesive layer 28 is shown having a thickness that is exaggerated for purposes of illustration. Layer 28 is formed of any one of several adhesives. In one embodiment, a polyester hot melt wet adhesive is rolled onto a central foam layer 30 prior to application of the polyester layers 26. The foam layer 30 is preferably available from Foamax under its trade name 921 D. Layer 30 is preferably wider than layers 26 and 34, and in one embodiment was 6.5 mm.

The foam layer 30 is provided with another adhesive layer 32 on its other side at the same time. A second polyester layer 34 is then combined with foam layer 30 by layer 32.

In another embodiment, a polyester adhesive web may be used for layers 28 and 32.

Also, a polyurethane adhesive available from Reichhold under its trade name 2U010/22014 may be utilized. This is also a wet adhesive which is rolled onto the foam layer 30.

By utilizing the polyester layers 26 and 32 in combination with a central foam layer formed of a plastic other than polyester, several unique benefits are provided. The polyurethane combined with the polyester layers provides a strong I-beam construction, a good visual appearance, and very good acoustical properties.

The use of a polyurethane-based adhesive in particular provides a very strong connection between the polyurethane foam layer 30 and the polyester layers 26 and 34.

In a preferred embodiment of forming this invention, the foam layer 30 is initially provided with the wet adhesive on both faces. The polyester mats are then placed on those faces and they are inserted into a heated mold. The heated mold then compresses the layers together to form the headliner 20.

Preferably, the mold temperature is between 280° F. and 340° F. Most preferably, the mold temperature is approximately 300° F. The mold time required is typically 20 to 55 seconds, and may vary depending on the substrate weight and thickness. The compression of the material should be at least 1.0 millimeters, less than the starting thickness to ensure an adequate bond, between the several layers. Greater compression can be performed if necessary for specific thicknesses. The mold pressure is preferably less than 12 psi.

The present invention thus provides a headliner with a specific construction which achieves valuable functional benefits. A worker of ordinary skill in the art would recognize that certain modifications would come within the scope of this invention. For that reason, the following claims should be studied to determine the true scope and content of this invention.

What is claimed is:

1. A headliner construction consisting essentially of:
   a central foam core formed of a plastic other than polyester;
   an inner and outer polyester layer formed of a plurality of polyester pieces formed into a felt mat; and
   adhesives based on either said plastic or polyester placed between said foam core and said inner and outer polyester layers.

2. A headliner construction comprising:
   an outer decorative layer;
   an adhesive binding said outer decorative layer to a first polyester layer, said first polyester layer being formed of a plurality of polyester pieces;
   said first polyester layer being positioned on one side of a central foam layer, said central foam layer being formed of polyurethane foam;
   a second polyester layer positioned on an opposed side of said foam layer from said first polyester layer formed of a plurality of polyester pieces.

3. A headliner construction as recited in claim 2, wherein said foam layer has a thickness which is greater than the thickness of either said first or second polyester layers.

4. A headliner as recited in claim 2, wherein said first and second polyester layers are spaced from said foam layer by intermediate adhesive layers.

5. A headliner as recited in claim 4, wherein said adhesive layers are polyurethane-based adhesives.

6. A headliner as recited in claim 4, wherein said adhesive layers are polyester-based adhesives.

7. A headliner construction comprising:
   a central foam core formed of a plastic other than polyester;
   an inner and outer polyester layer formed of a plurality of polyester pieces formed into a felt mat; and
   adhesives based on either said plastic or polyester placed between said foam core and said inner and outer polyester layers.

8. A headliner as recited in claim 7, wherein said plastic is polyurethane.

9. A headliner as recited in claim 7, wherein said inner and outer polyester layers are attached by said adhesives directly to said foam core.

10. A headliner as recited in claim 7, wherein said adhesives are polyurethane-based adhesives.

11. A headliner as recited in claim 7, wherein said adhesives are polyester-based adhesives.

12. A headliner as recited in claim 11, wherein said adhesives are wet polyester-based adhesives.

13. A headliner as recited in claim 11, wherein said adhesive is a polyester web adhesive.

14. A headliner as recited in claim 7, wherein an outer decorative layer is attached to an opposed face of one of said polyester layers relative to said foam core.

15. A headliner construction comprising:
   an outer decorative layer;
   an adhesive binding said outer decorative layer to a first polyester layer, said first polyester layer being formed of a plurality of polyester pieces;
   said first polyester layer being positioned on one side of a central foam layer, said central foam layer being formed of polyurethane foam; and
   a second polyester layer positioned on an opposed side of said foam layer from said first polyester layer formed of a plurality of polyester pieces.

* * * * *

UNITED STATES PATENT AND TRADEMARK OFFICE
CERTIFICATE OF CORRECTION

PATENT NO. : 6,214,456 B1
DATED : April 10, 2001
INVENTOR(S) : Stuart G. Boyd et al.

It is certified that error appears in the above-identified patent and that said Letters Patent is hereby corrected as shown below:

<u>Column 3, claim 2,</u>
Line 1, delete "comprising" and insert -- consisting essentially of --.

Signed and Sealed this

Twentieth Day of November, 2001

Attest:

*Nicholas P. Godici*

NICHOLAS P. GODICI
*Acting Director of the United States Patent and Trademark Office*

*Attesting Officer*